United States Patent [19]

Neal

[11] Patent Number: 4,668,416

[45] Date of Patent: May 26, 1987

[54] CORROSION INHIBITION OF ROAD DEICING

[75] Inventor: John A. Neal, Bellingham, Wash.

[73] Assignee: Georgia-Pacific Corporation, Atlanta, Ga.

[21] Appl. No.: 865,659

[22] Filed: May 16, 1986

Related U.S. Application Data

[63] Continuation of Ser. No. 691,132, Jan. 14, 1985, abandoned.

[51] Int. Cl.$^4$ ................................................. C09K 3/18
[52] U.S. Cl. .................................. 252/70; 106/123.1; 106/13; 252/88
[58] Field of Search ...................... 252/70, 88; 106/13, 106/123.1

[56] References Cited

U.S. PATENT DOCUMENTS

| | | | |
|---|---|---|---|
| 2,410,910 | 11/1946 | Wait | 252/70 |
| 3,173,864 | 3/1965 | Freedman | 210/698 |
| 3,639,278 | 2/1972 | Hwa | 252/82 |

FOREIGN PATENT DOCUMENTS

| | | | |
|---|---|---|---|
| 7137641 | 5/1971 | Japan | |
| 7612310 | 4/1976 | Japan | |
| 8038913 | 7/1980 | Japan | |
| 916526 | 3/1982 | U.S.S.R. | 252/88 |
| 1052523 | 11/1983 | U.S.S.R. | |

OTHER PUBLICATIONS

Kishitani, "Corrosion of Iron in Reinforced Concrete Protective Effect of Calcium Lignosulfonate for Corrosion by Chloride," Semento Konkuriito 1971 (289), 22–30 (CA 74:145890).

Hosokawa et al., *Proceedings of the 5th International Congress of Metal Corrosion*, pp. 579–581, published in 1974.

*Primary Examiner*—Robert A. Wax
*Attorney, Agent, or Firm*—Banner, Birch, McKie & Beckett

[57] ABSTRACT

A process of making a deicing or dust control agent with reduced corrosivity comprises mixing spent sulfite liquor and chloride salt of an alkali metal or alkaline earth metal proportionally so that the ratio of lignosulfonate solids of the spent sulfite liquor to metal chloride salt is from about 1:25 to about 15:1 and the pH of the mixture is from about 4.5 to about 8.5. The sulfite liquor: chloride salt product can be spread onto road surfaces in dried form, sprayed on as single or multiple solutions, and/or mixed with a non-slipping agent or the like.

16 Claims, No Drawings

CORROSION INHIBITION OF ROAD DEICING

This application is a continuation of application Ser. No. 691,132, filed Jan. 14, 1985, now abandoned.

BACKGROUND OF THE INVENTION

The present invention relates to deicing or dust control agents and their methods of use. More specifically, the present invention relates to the addition of spent sulfite liquor to chloride salts of alkali metals or alkaline earth metals. The amount of corrosion damage normally encountered in road deicing or dust control processes is reduced by the present invention.

It is generally recognized that the needs of business, industry, and the public in general demand that traffic be kept moving with reasonable saftey event in the face of snow or ice. Reliance on mechanical means of snow or ice removal alone, however, is insufficient to ensure the safe and efficient movement of traffic. At present the only feasible means for "bare pavement" maintenance is by the use of deicing salts. Rock salt or sodium chloride is the primary chemical used for deicing primarily because of its low cost, ease of transportation, and readily dispersible form.

The cost of deicing salt is deceptively low given the unassumed cost of corrosion to metal guardrails, bridge supports, metal concrete reinforcing rods and automobiles. Estimated cost of upgrading deficient bridges in the United States alone approaches $50 billion dollars. *Chemical Marketing Reporter,* Aug. 27, 1984.

Other chemicals have been used in place of alkali metal or alkaline earth metal chlorides such as mixtures of urea and calcium formate with a formamide spray, calcium magnesium acetate, metal sulfates, phosphates, nitrates, amides, alcohols, long-chain amines, and sodium dichromate. None of these chemicals have gained widespread popularity due to their high cost, low effectiveness and/or high degree of toxicity.

Some work has been performed on reducing the corrosivity of alkaline earth metal chloride salts applied to road surfaces by utilizing lignosulfonate as one component of a deicing or dust control agent. Japanese Patent No. 51-12310 discloses the use of a three-part mixture of calcium chloride, a small amount of calcium lignosulfonate and calcium hydroxide as a dust-control or anti-freezing agent. A 1 to 3 percent (dry weight) mixture of calcium lignosulfonate to calcium chloride (lignosulfonate:calcium chloride ratio up to 1:35) was tested, with essentially no corrosion inhibition. Some rust preventing effect was observed when calcium hydroxide was combined with calcium chloride. When both calcium lignosulfonate and calcium hydroxide were mixed with calcium chloride, however, a greater rust-preventing effect was demonstrated and the Japanese patent is specifically directed to the combination that contains both lignosulfonate and calcium hydroxide in combination with calcium chloride. Each of the combinations disclosed in the Japanese patent contains 1-5% calcium lignosulfonate and also contains at least as much calcium hydroxide. Tests have demonstrated that those solutions have a pH of about 10 or higher.

Spent sulfite liquor has been used for many years as a dust-control agent applied directly to dirt or gravel roads. Use of chloride salts of alkali metals and alkaline earth metals to prevent dusting is also known. Freight considerations often detemine whether spent sulfite liquor or chloride salts are used in any particular locality.

The prior art deicing or dust controlling agents such as sodium chloride, calcium chloride, magnesium chloride, or rock salt, ultimately cost the consuming public far more in corrosion damage than the initial material cost would indicate. Accordingly, a composition which alleviates the corrosion problem would be a highly desirable advance in the art of deicing or dust controlling agents for road surfaces.

SUMMARY OF THE INVENTION

It is an object of the invention to provide low-cost additives to deicing salts to reduce corrosion.

It is a still further object of the present invention to provide a deicing or dust control agent with reduced tendency to attack steel or aluminum road support, rods, beams, or autos.

It is yet another object of the present invention to produce a deicing agent with non-slip characteristics.

In accordance with these and other objectives, the present invention povides, in one aspect, a process for controlling ice and dust with reduced corrosivity for roadway metals comprising adding to a roadway surface a mixture of spent sulfite liquor and a metal chloride salt selected from the group consisting of alkali metal and alkaline earth metal chlorides in amounts such that the ratio (dry weight) of the lignosulfonate content of the spent sulfite liquor to metal chloride salt is from about 1:25 to about 15:1, said mixture having a pH of from about 4.5 to about 8.5.

In another of its aspects the present invention provides an ice and dust control composition comprising a mixture of spent sulfite liquor and a metal chloride salt selected from the group consisting of alkali metal and alkaline earth metal chlorides in amounts such that the ratio (dry weight) of the lignosulfonate content of the spent sulfite liquor to metal chloride salt is from about 1:25 to about 15:1, said mixture having a pH of from about 4.5 to about 8.5. In another embodiment a non-slipping agent may be mixed with the above prepared waste sulfite liquor-chloride salt mixture.

DETAILED DESCRIPTION

In accordance with this invention it has been discovered that where it is appropriate to use alkali metal or alkaline earth metal chloride salts as deicing or dust controlling agents, the corrosiveness to metal road barriers, bridges, concrete reinforcing rods and automobiles may be significantly reduced by the addition of spent sulfite liquor. The mixtures of this invention have a substantially neutral pH and therefore avoid causing corrosion due to either low or high pH. Aluminum, for example, can corrode at relatively high alkaline pHs.

The effectiveness of chloride metal salts in facilitating the deicing of roadways is attributable in part to their low cost, their ability to hole an iced surface allowing normal traffic to break up the sheets of ice, and the ease and uniformity by which they may be distributed over a road surface. Several salts are currently used including sodium chloride, calcium chloride, magnesium chloride, potassium chloride or mixtures thereof. These are often used in the mineral form, such as rock salt. All are contemplated for use in this invention. Sodium chloride and magnesium chloride are most frequently used on roads and are preferred materials for the practice of this invention.

Spent sulfite liquor is an ideal additive in that it is readily available, it is effective in reducing corrosion, it has a relatively low cost and is generally non-toxic. Spent sulfite liquor is a by-product of sulfite pulp mills in which wood or other plant materials are processed to separate the cellulose or pulp from the liquor. Such processes are, of course, well known. The principal ingredient of spent sulfite liquor as produced at the mill is lignosulfonate and is found generally to be present in amounts of from about 40% to about 70% or more by total dry weight with the remainder consisting of carbohydrates and other organic and inorganic compounds. In addition to the spent sulfite liquor as obtained from the sulfite pulping process (that is without substantial removal of other solids) spent sulfite liquors which have been subjected for fermentation to convert at least a portion of the carbohydrates to alcohol or to protein byproducts (fermented spent sulfite liquor) or which have been subjected to alkali oxidation to produce vanallin (vanallin raffinate) are also contemplated for use in this invention and are within the term "spent sulfite liquor" as used herein.

The spent sulfite liquor contains lignosulfonate as salts such as magnesium, calcium, sodium, potassium or ammonium salts and the weight ratios referred to herein are with respect to the salt.

It has been discovered that, in general, an effective lower limit for the ratio (dry weight) of spent sulfite liquor to metal chloride salt will provide a ratio (dry weight) of lignosulfonate to metal chloride salt of about 1:25. An upper limit beyond about 15:1 begins to lose the benefits derived from the use of the combination of ingredients. Ratios of from about 1:25 to about 15:1 can be employed for either ice or dust control, but when used for ice, a range of from about 1:15 to about 2:1 is preferred and a range of from about 1:8 to about 3:2 is particularly preferred. When used for dust control, a range of about 1:4 to about 2:1 is often preferred to provide best results. In each case the ratio refers to the dry weight of lignosulfonate salt in the spent sulfite liquor to the dry weight of metal chloride salt.

The mixtures of this invention have about a neutral pH. The pH of the mixtures is from about 4.5 to about 8.5, and mixtures that have a pH of from about 5 to about 8 are particularly preferred. Often the mixtures themselves will provide the desired pH but, if needed, the pH may be adjusted. If it is desired to adjust the pH upwardly any base can be used. Since the pH of many spent sulfite liquors tend to be slightly acidic, the need to adjust the pH downwardly occurs less frequently but may readily be accomplished by employing a mineral acid. The pH referred to herein is the pH determined when the mixtures of this invention are dissolved in water to provide a 10% by weight total solids concentration in the solution.

In operation, either liquid or dried spent sulfite liquor may be mixed with a solid or solution of metal chloride salt (with subsequent drying if appropriate) to provide liquid or solid mixtures contemplated by this invention. While, in one of its aspects, this invention contemplates applying a mixture of the ingedients to a surface, the invention also contemplates the separate application, either as a liquid or a solid, of each of the ingredients to the road surface.

Since the ingredients are essentially in a physical mixture, any appropriate mixing device may be employed. Moreover, additional ingredients, such as a non-slipping agent, may also be added during the mixing. Conventional non-slipping agents include sand, limestone, cinder grit and the like. Often the spent sulfite liquor will be essentially the only non-corrosive additive added to the chloride salt.

When used on roads and dry areas for dust control, application of the ingredients in conjunction with a liquid is generally employed. The ingredients can be applied in liquid form, one can be applied as a solid while the other is applied as a liquid, or the ingredients can be applied in solid form and the surface thereafter wet.

Because ice supplies moisture, application of the mixture to iced roads or to roads in danger of icing can be accomplished either in the liquid or the solid form. Most often, salt mixtures are applied as solids in icing conditions. Such practice, however, does not foreclose the option of applying either or both of the ingredients in liquid form.

The amount of the material to be applied to a road surface will vary widely depending upon the pupose (e.g.: dust control or icing) and the severity of conditions. Dilute salt solutions tend to be more corrosive, apparently because more oxygen is dissolved in dilute salt solutions, and therefore, the total amount of spent sulfite liquor in solution on the road is a factor in minimizing corrosion. When a good deal of water is expected (e.g., heavy icing or snow) ratios of ingredients having relatively more spent sulfite liquor and/or higher application rates may be desirable. The ratio and/or amount to be applied, however, is easily within the skill of the art.

When a non-slipping agent, such as sand, limestone, cinder grit and the like, is present, the mixture may be blended to provide an aqueous suspension of the non-slipping agent. Alternatively a dry mixture of spent sulfite liquor and non-slipping agent may be prepared and stored until needed for use in conjunction with a metal chloride salt. The dry mixture can be prepared by simply mixing dry solids or by applying a sulfite liquor solution to the non-slipping agent and thereafter drying the mixture. Once again, the dried mixture can be applied to the surface separately or in admixture with the metal chloride salt and the ingredients can be applied in any desired combination of liquid and solid form.

The invention is further illustrated by the following specific examples. These examples are included for illustrative purposes and are not intended to limit the scope of the invention. In these examples, the pH adjusted with the oxide or hydroxide of the metal cation corresponding to the metal of the metal chloride so that the pHs for the runs of each example were substantially the same in order to provide a basis for comparison.

EXAMPLE 1

Solutions of magnesium chloride were made up at the following concentrations of fermented calcium spent sulfite liquor (CaSSL) and magnesium chloride. The original CaSSL had been fermented with *Saccharomyces cerevisiae* to produce alcohol and the fermented spent CaSSL contained about 75% calcium lignosulfonate (dry solids basis). The pH was adjusted to about neutral with MgO. Corrosion rates were determined using a 1966 Magma Corporation Model 1170 Corrater ® corrosion rate measuring instrument, with a mild steel probe, then with an aluminum Alloy 5454 probe.

| Percent of Total Solution Weight | | Final pH | Corrosion Rate, mils/year | |
|---|---|---|---|---|
| MgCl$_2$ | Fermented CaSSL Solids | | Aluminum | Mild Steel |
| 5 | 0 | 7.4 | 1.4 | 5.7 |
| 5 | 5 | 6.8 | 0.8 | 3.0 |
| 5 | 10 | 6.6 | 0.8 | — |
| 5 | 15 | 6.8 | 0.8 | 2.4 |
| 10 | 0 | 6.5 | 2.0 | 8.1 |
| 10 | 5 | 7.1 | 0.5 | 2.1 |
| 10 | 10 | 6.8 | 0.5 | 1.7 |
| 10 | 15 | 6.6 | 0.4 | — |
| 0 | 5 | 7.5 | 0.5 | 2.9 |

EXAMPLE 2

The same solutions used in Example 1 were left for 25 days at ambient temperature with a mild steel washer immersed in each. Weight loss of the washers was determined.

| Percent of Total Solution Weight | | Final pH | Mild Steel, Avg. Wt. Loss, Per Day mg % |
|---|---|---|---|
| MgCl$_2$ | Fermented CaSSL Solids | | |
| 5 | 0 | 7.4 | 8.0 |
| 5 | 5 | 6.8 | 4.4 |
| 5 | 10 | 6.6 | 4.0 |
| 5 | 15 | 6.8 | 6.6 |
| 10 | 0 | 6.5 | 6.0 |
| 10 | 5 | 7.1 | 4.4 |
| 10 | 10 | 6.8 | 4.8 |
| 10 | 15 | 6.6 | 4.4 |
| 0 | 5 | 7.5 | 5.7 |

EXAMPLE 3

MgCl$_2$ solutions were made up and let stand overnight before testing with a mild steel probe on a 1966 Magma Corporation Model 1170 Corrater ®. The effect of dilution on corrosivity of the solution is demonstrated.

| Percent of Total Solution Weight | | Final pH | Mild Steel, Corrosion Rate (mils/year) |
|---|---|---|---|
| MgCl$_2$ | Fermented CaSSL Solids | | |
| 10 | 4 | 5.7 | 1.3 |
| 5 | 2 | 6.3 | 2.0 |
| 2.5 | 1 | 6.7 | 3.4 |
| 1.25 | 0.5 | 6.9 | 7.4 |
| 0.625 | 0.25 | 7.0 | 12.9 |

NaCl solutions were made up and pH was adjusted to those solutions of MgCl$_2$ above. As these data demonstrate, the more dilute solutions result in greater corrosion.

| Percent of Total Solution Weight | | Final pH | Mild Steel, Corrosion Rate (mils/year) |
|---|---|---|---|
| NaCl | Fermented CaSSL Solids | | |
| 10 | 4 | 5.7 | 2.5 |
| 5 | 2 | 6.3 | 3.0 |
| 2.5 | 1 | 6.7 | 6.0 |
| 1.25 | 0.5 | 6.9 | 10.0 |
| 0.625 | 0.25 | 7.0 | 14.6 |

CaCl$_2$ solutions were made up and pH was again adjusted to those in the above examples:

| Percent of Total Solution Weight | | Final pH | Mild Steel, Corrosion Rate (mils/year) |
|---|---|---|---|
| CaCl$_2$ | Fermented CaSSL Solids | | |
| 10 | 4 | 5.7 | 1.5 |
| 5 | 2 | 6.3 | 1.5 |
| 2.5 | 1 | 6.7 | 3.6 |
| 1.25 | 0.5 | 7.0 | 6.0 |
| 0.625 | 0.25 | 7.0 | 7.4 |

EXAMPLE 4

Solutions of 2.9% MgCl$_2$ were made up. The pH was adjusted with dilute MgO slurry. Samples were left overnight to equilibrate, then tested with a Magma Corporation Model 1170 Corrater ®. Mild steel washers were then placed in the solutions for 30 days and weight loss was determined.

| Percent of Total Solution Weight | | Final pH | Mild Steel Corrosion Rate | |
|---|---|---|---|---|
| MgCl$_2$ | Fermented CaSSL Solids | | (mils/year) | Avg. Wt. Loss Per Day mg % |
| 2.9 | 0 | 7.3 | 6.6 | 12.6 |
| 2.9 | 0.5 | 6.9 | 5.9 | 4.9 |
| 2.9 | 1.0 | 7.1 | 2.9 | 3.0 |
| 2.9 | 1.5 | 7.4 | 2.05 | 2.9 |
| 2.9 | 5.0 | 7.4 | 2.1 | 2.4 |

EXAMPLE 5

Sodium chloride solutions were made up and the pH was adjusted with very dilute NaOH, and allowed to stand overnight.

| Percent of Total Solution Weight | | Final pH | Mild Steel, Corrosion Rate (mils/year) |
|---|---|---|---|
| NaCl | Fermented CaSSL Solids | | |
| 5 | 0 | 7.0 | 10.5 |
| 5 | 2 | 6.3 | 3.0 |
| 10 | 0 | 7.0 | 6.9 |
| 10 | 4 | 5.7 | 2.5 |
| 20 | 0 | 7.0 | 2.5 |

EXAMPLE 6

Mild steel corrosion rate of MgCl$_2$ solutions consisting of fermented CaSSL or unfermented sodium spent sulfite liquor (NaSSL) were measured for corrosivity. The unfermented NaSSL contained about 65% sodium lignosulfonate.

| Percent of Total Solution Weight | | | pH | Aluminum Alloy 5454 Corrosion rate (mils/yr) | 24-Day Mild Steel Washer Weight Loss (mg %) |
|---|---|---|---|---|---|
| MgCl$_2$ | Fermented CaSSL Solids | Unfermented NaSSL Solids | | | |
| 5 | 10 | 0 | 6.6 | 0.8 | 4.1 |
| 5 | 0 | 10 | 7.0 | 0.5 | 4.0 |

EXAMPLE 7

Calcium chloride solutions containing fermented CaSSL were measured for corrosivity over a 24 day trial.

| Percent of Total Solution Weight | | | Avg. Wt. Loss Per Day (mg %) |
|---|---|---|---|
| CaCl$_2$ | Fermented CaSSL Solids | pH | |
| 5 | 0 | 6.1 | 8.6 |
| 5 | 5 | 5.8 | 4.7 |

EXAMPLE 8

See Example 4 for conditions.

| Percent of Total Solution Weight | | | Corrosion Rate | |
|---|---|---|---|---|
| MgCl$_2$ | Fermented CaSSL Solids | pH | Cor-rater ® (mils/year) | Mild Steel Avg. Wt. Loss Per Day (mg %) |
| 8.6 | 0.0 | 7.5 | 3.6 | 6.5 |
| 8.6 | 0.5 | 7.4 | 0.6 | 2.5 |
| 8.6 | 1.0 | 7.3 | 0.6 | 2.0 |
| 8.6 | 1.5 | 7.1 | 0.6 | 2.0 |

EXAMPLE 9

Calcium chloride solutions containing fermented CaSSL were measured for corrosivity after the pH was adjusted with CaO.

| Percent of Total Solution Weight | | | Corrosion Rate (mils/year) |
|---|---|---|---|
| CaCl$_2$ | Fermented CaSSL Solids | pH | |
| 5.0 | 0.25 | 6.3 | 2.5 |
| 5.0 | 1.0 | 7.1 | 2.4 |
| 5.0 | 2.0 | 8.1 | 1.5 |
| 0.625 | 0.25 | 7.0 | 7.4 |
| 0.625 | 2.0 | 7.0 | 1.8 |

EXAMPLE 10

Solutions of sodium chloride and fermented CaSSL were measured for corrosivity after pH was adjusted with diluted sodium hydroxide.

| Percent of Total Solution Weight | | | Corrosion Rate (mils/year) |
|---|---|---|---|
| NaCl$_2$ | Fermented CaSSL Solids | pH | |
| 5.0 | 0.0 | 7.0 | 10.5 |
| 5.0 | 0.25 | 8.1 | 4.7 |
| 5.0 | 1.0 | 7.1 | 3.7 |
| 5.0 | 2.0 | 6.3 | 3.0 |
| 2.5 | 1.0 | 6.6 | 6.0 |
| 2.5 | 2.0 | 7.0 | 2.5 |
| 0.625 | 0.25 | 7.0 | 14.6 |
| 0.625 | 2.0 | 7.0 | 2.1 |

The data collected above illustrate that significant reduction of corrosiveness may be obtained by the addition of a spent sulfite liquor. Example 4 illustrates that in a 2.9% MgCl$_2$ solution, a ratio of 1/6 spent sulfite liquor to MgCl$_2$ gives a 60% reduction in weight-loss due to corrosion, as compared to the same salt solution without spent sulfite liquor. Greater amounts of spent sulfite liquor reduce corrosion even more. Example 8 shows that with an 8.6% solution of MgCl$_2$ in a 1/17 ratio of spent sulfite liquor to MgCl$_2$, a 60% reduction in weight loss due to corrosion occurred in comparison to the same test mixture with no spent sulfite liquor. In Example 10, a ratio of calcium spent sulfite liquor to NaCl of as low as 1/20 in a 5% solution of NaCl, shows an effective decrease in corrosiveness of 5.8 mils/year in comparison to the same test mixture without spent sulfite liquor (the corrosion rate was more than cut in half). Examples 1 and 2 also demonstrate that fermented calcium spent sulfite liquor by itself causes somewhat more corrosion than many of the spent sulfite liquor:metal chloride mixtures.

Since variations of this invention will be apparent to those skilled in the art, it is intended that this invention be limited only by the scope of the appended claims.

I claim:

1. A process for deicing a roadway surface with low corrosion of roadway metals comprising adding to a snow or ice covered roadway surface an effective amount of a composition consisting essentially of a lignosulfonate and metal chloride salt mixture having a ratio (dry weight) of the lignosulfonate to the metal chloride salt from about 1:15 to about 2:1, said mixture having a pH of from about 4.5 to about 8.5, wherein said metal chloride salt is selected from the group consisting of alkali metal and alkaline earth metal chlorides.

2. The process of claim 1 wherein said lignosulfonate and said salt are added in dry form.

3. The process of claim 1 wherein said lignosulfonate comprises a spent sulfite liquor and said sulfite liquor and said salt are added to the roadway surface in solution.

4. The process of claim 1 wherein a non-slipping agent is also present in the mixture.

5. The process of claim 1 to control ice wherein said ratio is from about 1:8 to about 3:2.

6. The process of claim 1 wherein the pH of the mixture is from about 5 to 8.

7. The process of claim 1 wherein the metal chloride is sodium chloride.

8. The process of claim 1 wherein the metal chloride is magnesium chloride.

9. The process of claim 1 wherein the lignosulfonate comprises a fermented calcium spent sulfite liquor.

10. The process of claim 1 wherein the lignosulfonate comprises a sodium spent sulfite liquor as obtained from the sulfite process.

11. A deicing composition with reduced corrosivity for roadway metals consisting essentially of a mixture of a lignosulfonate and an alkali metal chloride salt having a ratio (dry weight) of the lignosulfonate to the alkali metal chloride salt of from about 1:25 to about 15:1, said mixture having a pH of from about 4.5 to about 8.5.

12. The deicing composition of claim 11 wherein said alkali metal chloride salt is sodium chloride and wherein said ratio (dry weight) of the lignosulfonate to the sodium chloride is from about 1:15 to about 2:1.

13. A deicing composition with reduced corrosivity for roadway metals consisting essentially of a combination of a lignosulfonate and an alkali metal chloride and alkaline earth metal chloride salt mixture having a ratio (dry weight) of the lignosulfonate to the salt mixture of from about 1:25 to about 15:1, the combination of lignosulfonate and the salt mixture of alkali metal chloride and alkaline earth metal chloride having a pH of from about 4.5 to about 8.5.

14. The deicing composition of claim 13 wherein said alkali metal chloride is sodium chloride, said alkaline earth metal chloride is magnesium chloride, and said ratio of the lignosulfonate to the salt mixture of sodium chloride and magnesium chloride is from about 1:15 to about 2:1.

15. The deicing composition of claim 12 wherein said ratio is from about 1:8 to about 3:2.

16. The deicing composition of claim 14 wherein said ratio is from about 1:8 to about 3:2.

* * * * *